(12) United States Patent
Handler

(10) Patent No.: US 6,291,769 B1
(45) Date of Patent: Sep. 18, 2001

(54) DEVICE PLATE FOR DIVIDED CABLE RACEWAY

(75) Inventor: Jordan S. Handler, Stamford, CT (US)

(73) Assignee: Mono-Systems, Inc., Rye Brook, NY (US)

( * ) Notice: Subject to any disclaimer, the term of this patent is extended or adjusted under 35 U.S.C. 154(b) by 0 days.

(21) Appl. No.: 09/473,181

(22) Filed: Dec. 28, 1999

(51) Int. Cl.⁷ ............................................. H02G 3/14
(52) U.S. Cl. ..................... 174/66; 174/67; 220/241; 220/242; 220/439; 220/538
(58) Field of Search ................... 174/66, 67, 17 CT, 174/53, 48, 135, 68.1; 220/3.8, 241, 242; 439/536, 537, 538, 539

(56) References Cited

U.S. PATENT DOCUMENTS

| | | | |
|---|---|---|---|
| 2,788,187 | * 4/1957 | Cookson et al. | 248/27.1 |
| 4,308,418 | * 12/1981 | Van Kuik et al. | 174/48 |
| 4,627,684 | * 12/1986 | D'Amato | 439/892 |
| 4,646,211 | * 2/1987 | Gallant et al. | 362/149 |
| 5,158,478 | * 10/1992 | Schuplin | 439/538 |
| 5,614,695 | * 3/1997 | Benito Navazo | 174/48 |
| 5,879,185 | 3/1999 | Handler et al. | 439/538 |

* cited by examiner

Primary Examiner—Anthony Dinkins
Assistant Examiner—Dhiru R Patel
(74) Attorney, Agent, or Firm—Ostrolenk, Faber, Gerb & Soffen, LLP

(57) ABSTRACT

A device plate for a divided cable raceway for preventing electrical interference between two sides of a raceway divided by the dividing panel. The device plate having a first electrical device receiving opening or a mounting fixture, connection or socket for an electric device toward one longitudinal side region and one lateral side region of the plate and having a second electrical device mounting fixture toward the opposite longitudinal side region and lateral side region of the device plate, and the device plate being blank at the opposite lateral side of the raceway at each longitudinal position along the raceway, thereby providing separation between the electrical device receiving openings, or mounting fixtures, or connections or sockets on the device plate and minimizing electrical interference at devices secured on the device plate and between cables and wires in the divided passageways in the raceway.

10 Claims, 2 Drawing Sheets

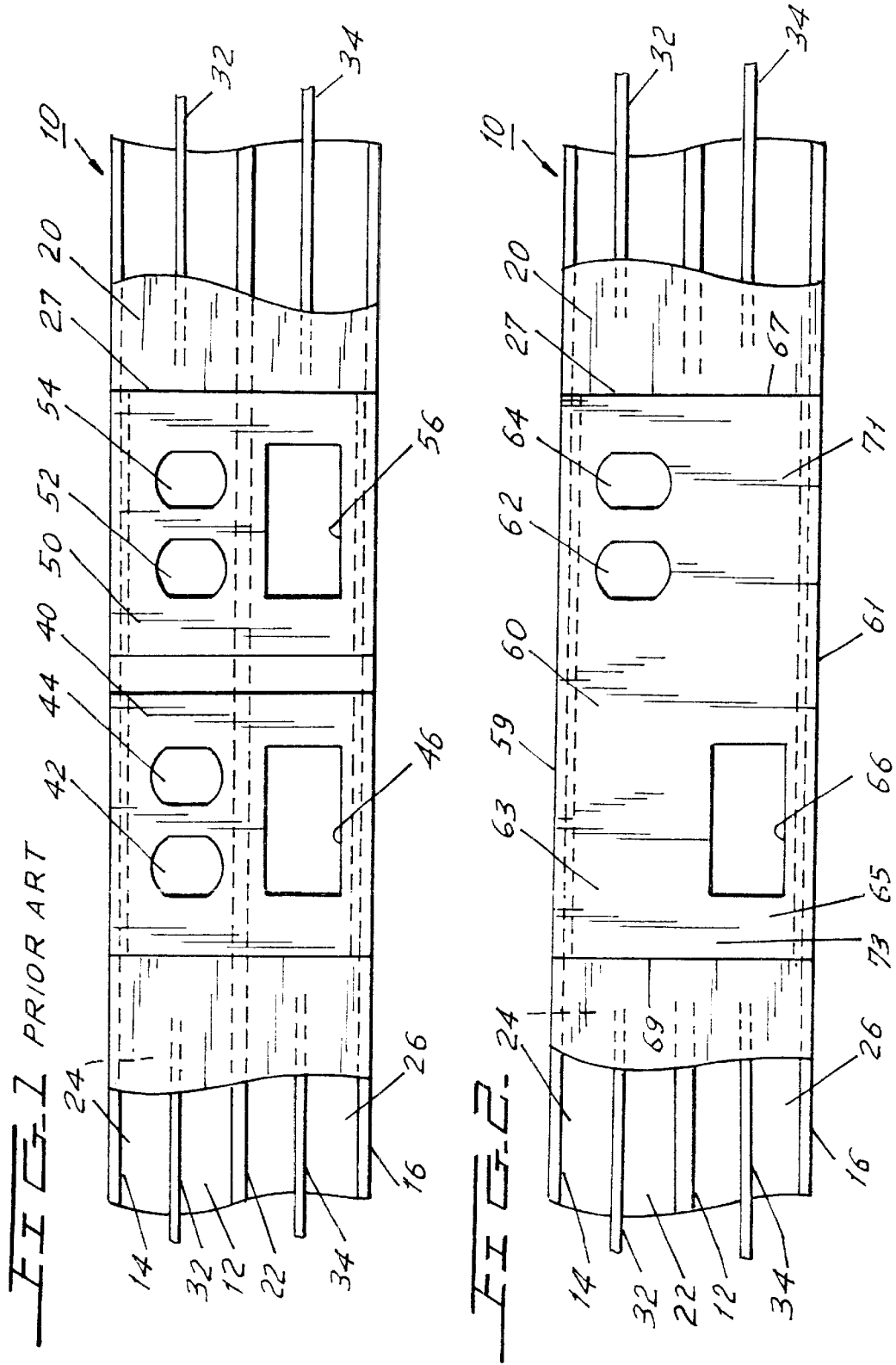

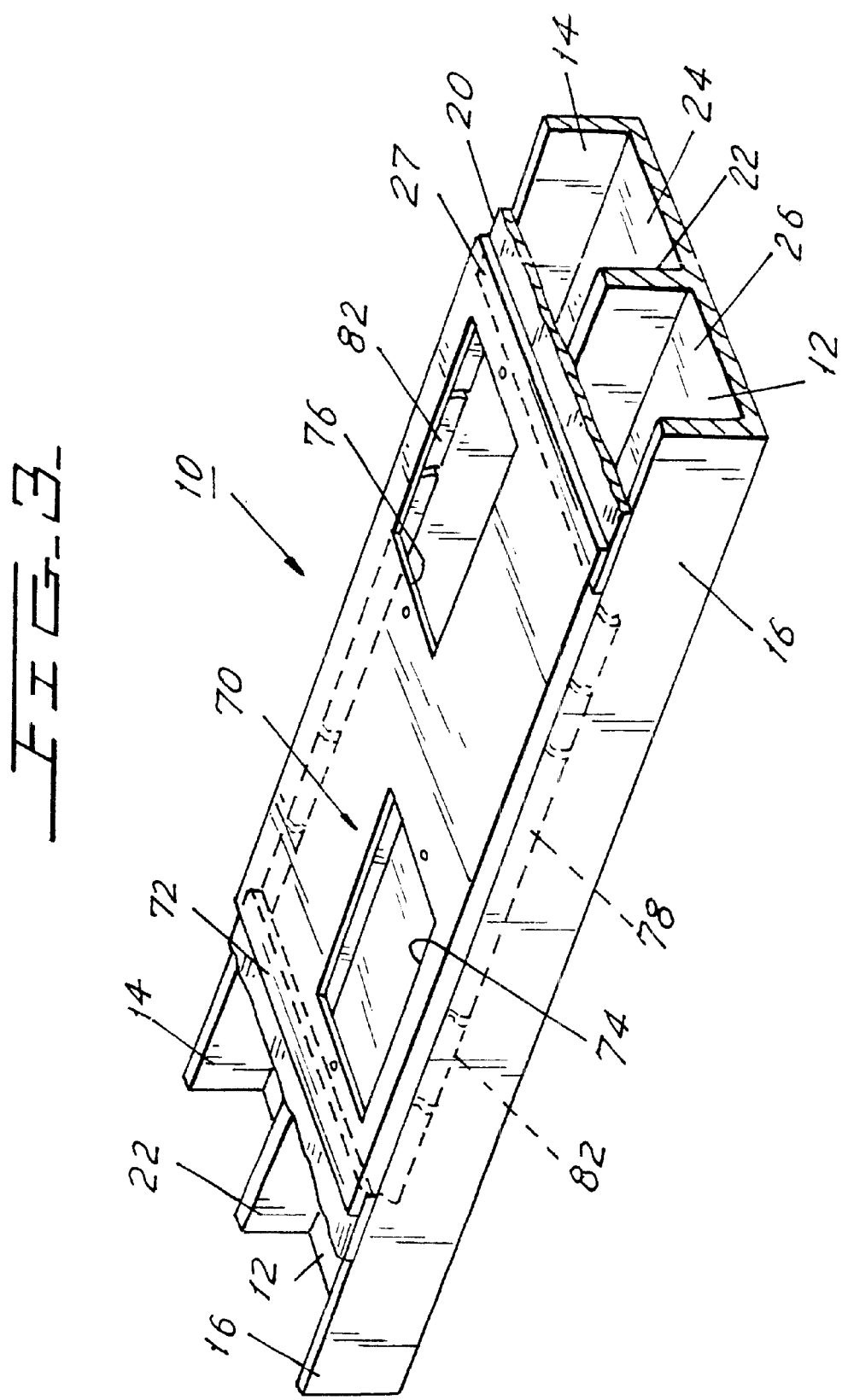

DEVICE PLATE FOR DIVIDED CABLE RACEWAY

BACKGROUND OF THE INVENTION

The present invention relates to cable raceway and particularly to a device plate mounted on the raceway.

Electrical and data cables and wires are carried along walls, ceilings and floors inside building structures by passing along trays or raceways which include a channel for carrying and guiding the cables and wires. The channel may have exits for the cables and wires and may have connections or fixtures at the channel for connecting devices to cables in the channel. An example of a cable raceway is seen in U.S. Pat. No. 5,879,185.

Usually, several cables and wires are carried through the raceway channel. Many raceways are divided into two channels by a divider running along the raceway channel for enabling separation of different cables and wires in the two channels. In a typical divided raceway, higher voltage wires pass along one side of the divider, e.g. for power transmission, and lower voltage wires pass along the other side of the divider, e.g. for communication wires and data transmission. The divider helps to prevent electrical interference between the different voltage wires, between different fixtures or device connections at the two sides of the raceway or between devices located at the two sides of the raceway or connected at fixtures or connections to cables or wires in the two sides of the raceway.

A typical cable raceway comprises a channel or channels with an open side into the building structure in which the raceway is mounted. The channel has a cover over the open side enclosing wires or cables in the channel. At intervals along the raceway, various electric cable supplied devices are connected by fixtures or connections on the raceway to the cables within the raceway. To facilitate the connections at those intervals, device plates are disposed in the cover of the raceway. The devices may be electrically plugged into a connection or fixture on the device plates and some devices are physically mounted on the device plate, and there is an electrical connection between the cable in the raceway and contacts of the device or the connection or fixture at the device plate.

Typically, power devices (higher voltage) and data devices (lower voltage) are mounted at a single device plate, and the device plate has openings or sockets for receiving the electrical devices themselves or the electrical plug connection from the device. With a divided raceway with a divider located between sides of the channel, the power device or its fixture, connection or socket is in the device plate at one side of the raceway divider and the data device or its fixture, socket or connector is in the device plate at the other side of the divider. Because the divider runs along the raceway, the two devices mounted to the single device plate or the two difference fixtures, connections or sockets at opposite sides of the divider are physically separated and electrically separated by the divider.

Some cautious engineers do not deem the separation by the divider in the raceway to be complete enough separation to avoid potential electrically interference.

There has been recognition of the value of not having the two devices, or the fixtures or connectors for those devices which are on opposite sides of the divider, i.e., the higher voltage device or the fixture therefor on one side of the divider and the lower voltage device or the fixture therefor on the other side of the divider, being positioned one above the other, that is at the same location along the length of the raceway. It has been recognized as desirable to separate the high voltage and low voltage devices not only at the opposite sides of the divider but as longitudinally spaced apart along the raceway. This has been accomplished in practice by placing two device plates next to each other in the length direction along the raceway, with one device plate receiving the higher voltage fixture, socket, or connection or device and the other device plate receiving the lower voltage fixture, socket, or connection or device. Each of the two device plates typically includes an additional unused fixture, socket or connection at the other divided side of the raceway, with no device connected there. This solution further separating the high and low voltage fixtures or connections is costly in terms of material, requiring two device plates for each device location and in terms of the labor of having to install two device plates.

SUMMARY OF THE INVENTION

It is an object of the present invention to provide more complete electrical separation between different electrical devices at or on a device plate on a cable raceway or connected to fixtures on the raceway, and more particularly to provide electrical separation and avoid potential interference between devices on or connected at the device plate at opposite sides of the divider in a raceway.

According to the invention, a single device plate is provided having an opening in it for receiving a device or for receiving a fixture, socket or connection for the device at one side of the divider and having another opening in it for receiving a device or for receiving a fixture, or socket or connection at the other side of the divider, wherein the openings and therefore the fixtures, sockets or connections are also longitudinally offset from each other along the length direction of the cable raceway. This reduces the number of device plates that must be produced, obtained and installed because only a single device plate need be installed. Further, the positions of the devices or their fixtures, sockets or connections along the raceway can be preselected to best obtain the interference free mounting of the higher and lower voltage devices without electrical interference.

The foregoing another objects and features of the invention will be apparent from the following description of a prior art embodiment and of a preferred embodiment according to the invention.

BRIEF DESCRIPTION OF THE DRAWINGS

FIG. 1 is a top view of a portion of a cable raceway including a device plate arrangement according to the prior art;

FIG. 2 is a top view of a cable raceway structure divided and with a device plate cording to the invention; and FIG. 3 is a perspective view of another embodiment of the cable raceway structure.

DESCRIPTION OF A PRIOR ART EMBODIMENT

FIG. 1 shows a fragment of a cable raceway 10. The cable raceway is an enclosed, channel shape structure including a back wall 12 which is usually mounted to a surface (not shown) on which the raceway is supported e.g., a ceiling, wall, or floor of a building, two short height upstanding side walls 14, 16 tall enough to receive all of the cables to be carried in the raceway and short enough to guide the cables, and an open front side, which is covered by a removable cover 20. This raceway has a generally centrally disposed, longitudinally running, dividing panel 22, which projects forward from the back wall 12 and extends generally to the height of the cover 20, to block electrical interference between cables or wires in the divided channels 24 and 26 and between electric devices on or connected at different fixtures, sockets or connections to the raceway. The entire raceway structure is preferably a grounded metal housing and the dividing panel 22 is also metal to prevent electrical interference between the cables and wires in the two channels 24 and 26 in the raceway. First cables or wires 32 which extend through the channel 24 may be lower voltage wires or cables for a communication device (telephone, computer, etc.). Second cables or wires 34 which extend through the channel 26 may be higher voltage cable for supplying higher voltage and power to devices requiring that. The dividing panel 22 between the channels 24 and 26 prevents electrical interference caused by the two different voltage levels of the cables 32 and 34 and also between the devices connected to those sets of cables and wires.

At periodic intervals along the raceway 10, the cover 20 has gaps or interruptions 27 at which a device plate is positioned. The plate is slightly longer than the gap in the cover 20 so that the plate overlies the edges of the gap. The plate has openings at which one either directly mounts devices to be connected with the cables or wires in the raceway or the openings provide entrances to or mounts for an electrical fixture, connection or socket to such a device. The prior art device plate 40 is supported atop the side walls 14, 16 of the raceway and includes device fixtures, here in the form of communication wire exit openings 42, 44 for the lower voltage or power wires 32. The same device plate 40 has another opening in it or a device fixture, connection, or socket for device, here shown in the form of an opening 46 for a connection to a high power device or for receiving that device itself.

The dividing panel 22 between the channels 24 and 26 is intended to prevent electrical interference between the cables and wires 32 and 34 and between the fixtures, connections or sockets at, or between the devices connected at, the device plate openings 42, 44 on the one hand and 46 on the other hand. But, there may not be optimum avoidance of electrical interference, or a cautious designer would want to further assure that there would be no such interference.

A cautious designer might employ a second device plate 50 offset along the raceway 10, and shown next to plate 40. The plate 50 may be substantially identical to the device plate 40 including low voltage wire exit openings for devices or their fixtures 52, 54 and a higher voltage connection opening for devices or their fixtures 56. The cautious engineer or system designer might make the lower voltage wire connections at or place the lower voltage devices the exit openings 42, 44 on the device plate 40 and provide no fixture or connection at or device at the opening 46 in the device plate 40 and instead provide the device or the fixture or connection to the higher power device at the opening 56 in the device place 50 and provide no lower voltage device, fixture or connection at the exit connection openings 52, 54 of the plate 50. By this expedient, the designer would have both separated the high and low voltage devices and the wires and cables by the dividing panel 22 and also have separated them further along the raceway by the use of two device plates. The obvious drawbacks are having to acquire two device plates, using device plates with some of the openings therein being formed but not used and the labor of installing two device plates. These are preferably avoided according to the present invention.

DESCRIPTION OF A PREFERRED EMBODIMENT

In FIGS. 2 and 3, essentially the same raceway 10 is used as in the prior art embodiment of FIG. 1 and the same reference numbers are used for the same elements in both raceways 10. The improvement of the present invention is in the new device plate 60 which, like device plates 40 or 50, has first openings or fixtures or connections, in the form of low voltage wire connections 62 and 64, positioned on the device plate entirely at one side of the dividing panel 22 in the raceway and has a second device, fixture or connection, in the form of high voltage or high power device connection at opening 66, positioned on the device plate entirely at the other side of the dividing panel 22. The device plate has opposite longitudinal sides 59, 61 and adjacent longitudinal side regions 63, 65 at respective opposite sides of the dividing panel 22, with the first fixtures 62, 64 in one longitudinal side region 63 and the second fixtures 66 in the other longitudinal side region 65.

In addition to the first fixtures or openings 62 and 64 on the one hand and the second fixture or opening 66 on the other hand being on opposite sides of the dividing panel 22, they are also offset from each other along the length direction of the raceway. The device plate has opposite lateral sides 67, 69 which join its longitudinal sides 59, 61. The plate has a first lateral side region 71 toward one lateral side 67 and the plate has a second lateral side region 73 toward the other lateral side 69. The first fixtures or openings 62, 64 arc at the first lateral side region 71 and the second fixture or opening 66 is at the second lateral side region 73. This increases the spacing between the two different sets of fixtures or openings 62, 64 and 66 to further assure avoidance of electrical interference between the wires and cables within the cable raceway and the devices at or connected at the low voltage fixtures or connections 62, 64 at one longitudinal side 63 of the dividing panel 22 and at the higher voltage or higher power fixture or connection 66 at the other longitudinal side 65 of the dividing panel 22.

In the device plate 60 additionally, at the same location along the raceway and the device plate, there is no high voltage or high power fixture or connection opening opposite the low voltage connection 62, 64 across the panel 22 and there are no low voltage fixtures or connections or openings therefore in the device plate opposite the high voltage or high power fixture or connection 66 across the panel 22. The foregoing arrangement provides economy in manufacture, since a single device plate is provided, not two device plates, since there are no wasted or unused fixtures or openings formed in the device plate, and there is reduction in the labor involved in installation, since only a single device plate is provided and installed. Further, the longitudinal separation of the fixtures or connections to the low voltage and high voltage or high power cables can be selected for safety and interference avoidance purposes by the initial designer of the device plate, without the designer or assembler of the raceway itself having to select particular device plates or having to locate and space apart the selected device plates. It is easier for the designer to provide optimum spacing along the raceway between the lower voltage and higher voltage fixtures or connections.

The device plate 60 may be removably attached to the raceway 10 in the usual way in which such device plates are attached and in the usual way the raceway cover is attached. There may be bracket connections, snap in connections, etc. But the snap in connection is preferred.

The benefit of the present invention is that a single device plate is provided that permits the cables and power devices to be offset on opposite sides of the raceway and also be set off along the length of the raceway. The gap in the cover 20 is slightly less than the length of the device plate. The edges of the device plate overlie the edges of the cover at the gap for hiding those edges from view.

Referring to FIG. 3, the offset device plate embodiment 70 shown in FIG. 3 includes a flat plate surface 72 with a first device plate receiving fixture, opening or socket 74 and a second such fixture, opening or socket 76. Each of the openings 74 and 76 can receive a respective electric device. Each of the openings is at a respective opposite side of the dividing panel 22 in the raceway and the openings are also offset along the direction of the raceway in the device plate so that there is a blank region in the side of the device plate opposite each of the openings 74 and 76.

The underside of the plate 70 is provided with two spaced apart depending flanges 78 by which the device plate is guided into the open side of the raceway. Along the flanges 78 are locking tabs 82 which engage the side walls 14, 16 of the raceway and retain the device plate on the raceway. The gap in the cover 20 is slightly less than the length of the device plate. The edges of the device plate overlie the edges of the cover at the gap for hiding those edges from view.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device plate for an electrical wire raceway, wherein the device plate has a longitudinal dimension along the direction of extension of the raceway and a width direction across the raceway when the device plate is installed in the raceway; the device plate comprising:

opposite longitudinal side edges along the longitudinal sides of the raceway and longitudinal side regions with a first longitudinal side region toward one longitudinal side edge of the device plate and a second longitudinal side region toward the other longitudinal side edge of the device plate; the device plate having opposite lateral sides and having a first lateral side region toward one lateral side of the device plate and a second lateral side region toward the other lateral side of the device plate;

a first electric device receiving opening, or a mounting fixture or connection or socket for an electric device in the device plate in the first longitudinal side region and toward the first lateral side region of the device plate, with no electrical device mounting fixture at the second longitudinal side region of the device plate toward the first lateral side region;

a second electric device receiving opening, or a mounting fixture or connection or socket for an electric device in the device plate in the second longitudinal side region and toward the second lateral side region of the device plate, with no electrical device mounting fixture at the first longitudinal side region of the device plate toward the second lateral side region;

whereby the first and second electrical device mounting fixtures are both longitudinally offset along the device plate and laterally offset through opposite positions on the width of the device plate.

2. The device plate of claim 1, wherein the device plate is divided between the first and second longitudinal side regions and the first opening fixture, connection or socket is entirely in the first longitudinal side region while the second opening, fixture, connection or socket is entirely in the second longitudinal side region.

3. The device plate of claim 2, wherein the first opening, fixture, connection or socket is entirely in the first lateral opening, fixture, connection or socket side region of device plate and not in the second lateral side region and the second fixture is entirely the second lateral side region and not in the first lateral side region of the device plate.

4. The device plate of claim 1, further comprising flanges with locking tabs on the side of the device plate for mounting the device plate in a cable raceway.

5. The device plate of claim 1, further comprising the device plate having a rear side facing into the channel and having flanges on the rear side for engaging the side walls of the channel, when the device plate is placed on the channel, for holding the device plate in the channel.

6. An electrical wire raceway including a device plate, wherein the raceway comprises a channel having a back side, opposite longitudinally extending side walls defining the longitudinal sides of the channel and a front side cover over the front side of the channel and closing the front side;

a dividing panel extending from the back side of the channel toward the front side of the channel for providing electrical separation between wires passed through the channel and disposed at one and the other sides of the dividing panel;

a device plate for an electrical wire raceway, wherein the device plate has a longitudinal dimension along the direction of extension of the raceway and a width direction across the raceway when the device plate is installed in the raceway; the device plate comprising:

opposite longitudinal side edges along the longitudinal sides of the raceway and longitudinal side regions with a first longitudinal side edge region toward one longitudinal side edge of the device plate a second longitudinal side region toward the other of the longitudinal side edge of the device plate; the device plate having opposite lateral sides and having a first lateral side region toward one lateral side of the device plate and a second lateral side region toward the other lateral side of the device plate;

a first electric device receiving opening, or a mounting fixture or connection or socket for an electric device in the device plate in the first longitudinal side region and toward the first lateral side region of the device plate, with no electrical device mounting fixture at the second longitudinal side region of the device plate toward the first lateral side region;

a second electric device receiving opening, or a mounting fixture, or connection or socket for an electric device in the device plate in the second longitudinal side region and toward the second lateral side region of the device plate, with no electrical device mounting fixture at the first longitudinal side region of the device plate toward the second lateral side region;

whereby the first and second electrical device mounting fixtures are both longitudinally offset along the device plate and laterally offset through opposite positions on the width of the device plate.

7. The combination of claim 6, wherein each of the first and second fixtures comprises a respective opening through the device plate.

8. The combination of claim 6, further comprising the device plate having a rear side facing into the channel and having flanges on the rear side for engaging the side walls of the channel, when the device plate is placed on the channel, for holding the device plate in the channel.

9. The combination of claim 6, wherein the dividing panel on the raceway is comprised of metal.

10. The combination of claim 6, wherein the raceway is comprised of the metal.

* * * * *